C. S. TREACY.
COMBINED CLAMP AND SUPPORT.
APPLICATION FILED MAY 10, 1916.
1,224,515.
Patented May 1, 1917.
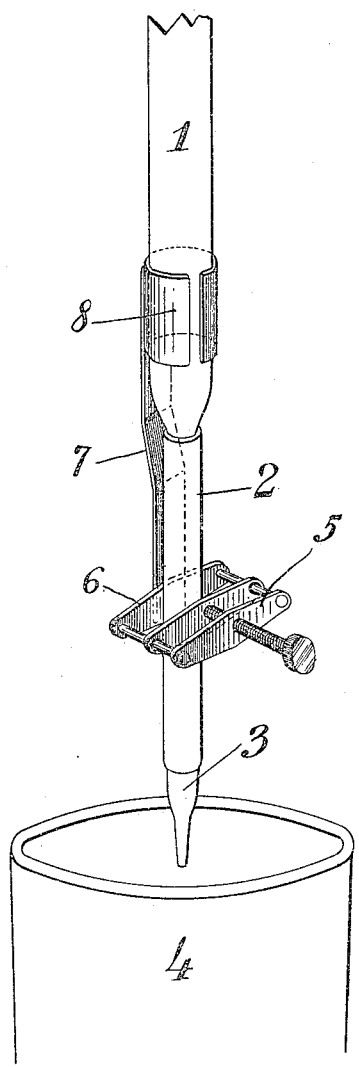
Cyril S. Treacy, Inventor
By his Attorneys
Mastick & Lucke

UNITED STATES PATENT OFFICE.

CYRIL STANTON TREACY, OF NEW YORK, N. Y.

COMBINED CLAMP AND SUPPORT.

1,224,515.  Specification of Letters Patent.  Patented May 1, 1917.

Application filed May 10, 1916. Serial No. 96,492.

*To all whom it may concern:*

Be it known that I, CYRIL S. TREACY, a citizen of the United States, and a resident of the borough of Manhattan, city, county, and State of New York, have invented certain new and useful Improvements in Combined Clamps and Supports, of which the following is a specification.

This invention relates to a combined clamp and support.

More particularly, this invention relates to a combined clamp and support for use with burettes and similar chemical apparatus. An object of the invention is to provide a clamp and support, preferably combined as a unitary structure, whereby the clamp is firmly supported and independently of its engagement with the rubber tube or other yieldable portion of the burette.

I have found in practice my invention to be of marked advantage in that the support effects a firm positioning of the clamp and enables the operator to manipulate the clamp with extreme refinement of adjustment. A further advantage of my invention is that it enables the operator to adjust the clamp with one hand only, thus allowing the other hand of the operator to be free to perform other operations, if desired.

Further features and objects of my invention will be more fully understood from the following description and accompanying drawing, showing a perspective view of a preferred form of my invention.

Referring to the drawing, the burette 1 is shown provided with the rubber outlet 2, and usual glass tip 3. The burette is supported from the usual stand, or otherwise, in proper relation to the beaker 4. The clamp 5 has a fixed portion thereof, such as the back plate 6, fixed to the extension 7 projecting from the base 8. Preferably, the clamp 5 is of an adjustable screw type such as is indicated in the drawing, and usually made of metal or other stiff material. Preferably, the base 8 is in the form of a yieldable sleeve constructed to be adjustably or frictionally carried directly by the burette. As shown, the base 8 is constructed as a split sleeve or having oppositely disposed juxtaposed arms formed of suitable metal or other resilient material. The extension 7 may also be formed of suitable metal or the like.

The combined clamp and support is readily positioned onto the burette 1 by passing the sleeve 8 past the tip 3 and rubber tubing 2 until the base 8 is properly positioned thereon. The clamp 5 will then be in a position to squeeze a section of the rubber tubing 2 to thereby restrict the flow of the liquid therethrough into the beaker 4. As the reaction in the beaker 4 approaches a critical stage, the reactant from the burette 1 is restricted more and more, which result is most effectively attained by reason of the firm support of the clamp 5.

It will also be noted that the force applied upon manipulating the clamp does not tend to draw the flexible tubing or equivalent from connection with the burette tube, but maintatins the burette and auxiliary parts in proper relation to the beaker and thus facilitates precise results.

It is advantageous in the manufacture of my invention as well as when it is in use or placed in storage, to assemble the parts thereof as a unitary article. It will be appreciated that other types of clamps may be used. The invention is particularly advantageous for use with the screw type pinch cock, in that after once having adjusted the degree of flow, the operation takes place without further manipulation under such conditions of run, thus minimizing the extent of manual handling.

Whereas, I have illustrated my invention by specific embodiments thereof, it will be understood that many changes and modifications may be made without departing from my invention.

I claim:

1. The combination with a burette and flexible outflow means connected thereto, of a base directly engaging and supported by said burette, a clamp in operative relation to said flexible outflow means and a member rigidly connecting a fixed portion of said clamp with said base.

2. The combination with a burette and flexible outflow means connected thereto, of a base having yieldable arms directly engaging and supported by said burette, a clamp in operative relation to said flexible outflow means and a member rigidly connecting a fixed portion of said clamp with said base.

3. The combination with a burette and flexible outflow means connected thereto, of a base having circularly extending arms frictionally engaging said burette and supported thereby, a screw clamp for said flexible outflow means and a member rigidly connecting said base with a fixed portion of said clamp.

4. As an article of manufacture, a clamp and support therefor for use with a burette having flexible outflow means, comprising a base having oppositely extending arms adapted to directly frictionally engage the burette, a screw clamp for controlling the flexible outflow means and a member rigidly connecting said base with a fixed portion of the screw clamp.

In testimony whereof I have signed this specification.

CYRIL STANTON TREACY.